United States Patent
von Seidel

(10) Patent No.: US 8,677,890 B2
(45) Date of Patent: Mar. 25, 2014

(54) FOOD STEAMING APPARATUS

(75) Inventor: Michael von Seidel, Somerset West (ZA)

(73) Assignee: Chef 2000 (Pty) Ltd, Selcourt Springs (ZA)

(*) Notice: Subject to any disclaimer, the term of this patent is extended or adjusted under 35 U.S.C. 154(b) by 0 days.

(21) Appl. No.: 13/574,145

(22) PCT Filed: Jan. 19, 2011

(86) PCT No.: PCT/IB2011/000074
§ 371 (c)(1),
(2), (4) Date: Jul. 19, 2012

(87) PCT Pub. No.: WO2011/089504
PCT Pub. Date: Jul. 28, 2011

(65) Prior Publication Data
US 2012/0291636 A1   Nov. 22, 2012

(30) Foreign Application Priority Data

Jan. 20, 2010 (ZA) .................. 2010/00401

(51) Int. Cl.
*A47J 27/04* (2006.01)
*F24D 1/00* (2006.01)

(52) U.S. Cl.
USPC .............. 99/417; 99/418; 99/415; 99/449; 126/369

(58) Field of Classification Search
USPC ........... 99/417, 418, 415, 410, 416, 449, 456, 99/473, 480, 481; 126/369
See application file for complete search history.

(56) References Cited

U.S. PATENT DOCUMENTS

| | | | |
|---|---|---|---|
| 5,069,198 A | | 12/1991 | Henderson et al. |
| 5,361,686 A | * | 11/1994 | Koopman ............ 99/421 H |
| 5,611,265 A | * | 3/1997 | Ronci et al. ............. 99/353 |
| 5,732,614 A | * | 3/1998 | Oslin ....................... 99/341 |
| 6,564,699 B1 | * | 5/2003 | Vincente et al. .......... 99/468 |
| 6,847,013 B2 | * | 1/2005 | Audette et al. .......... 219/400 |

FOREIGN PATENT DOCUMENTS

| | | |
|---|---|---|
| EP | 0326105 A1 | 8/1989 |
| FR | 2640147 A1 | 6/1990 |
| GB | 2234669 A | 2/1991 |

* cited by examiner

*Primary Examiner* — Reginald L Alexander
(74) *Attorney, Agent, or Firm* — The Webb Law Firm

(57) ABSTRACT

Disclosed is a divider for a food steaming apparatus of the type generally including a tubular body and at least one perforated food support. The divider includes a plurality of dividing walls extending from a central region to a peripheral region and wherein a major part of the area of each wall is provided with multiple perforations passing therethrough. At least one opening extends along the lower edge region of each dividing wall with a generally flat deflector flap that extends at an incline to the deflector wall having an operatively upper edge joined to the top of the opening and an operatively lower edge spaced circumferentially therefrom. In use, rising gases contact the deflector flap and follow the upwards incline thereof thereby acquiring a circumferential component to the direction of movement. The perforations preferably have apertures that impart circumferential movement to gases passing through the perforations.

10 Claims, 2 Drawing Sheets

FOOD STEAMING APPARATUS

FIELD OF THE INVENTION

This invention relates to food steaming apparatus of the type that includes perforated dividing and supporting walls through which steam is to pass during its passage through the food steaming apparatus. More particularly, the invention relates to food steaming apparatus of the general type described in South African patent number ZA90/05387 to which, inter alia, British patent publication number GB2234669 corresponds and the content of which is incorporated herein by reference.

Still more particularly, the invention relates to food steaming apparatus including a divider assembly wherein the walls of the divider are generally vertically orientated in use and that typically serve the purpose of separating different types of food being steamed. However, in the instance of the food steaming apparatus described in said earlier patent, the divider may simply be used for the purpose of imparting a swirling action to steam passing through the food steaming apparatus and the food located on each side of a divider wall may be of the same type.

BACKGROUND TO THE INVENTION

Food steaming apparatus of the type described in said earlier patent operates effectively, and to good advantage, in consequence of a swirling action that is imparted to steam passing through the steaming apparatus, in use, as a result of the special shape and configuration of the perforations. Such perforations each have an integral deflector zone that extends out of the plane of the perforated food support or divider, as the case may be. Each deflector zone has a free edge defining part of the periphery of an aperture of the associated perforation wherein the plane of the aperture is transverse to the plane of the perforated food support or divider wall. The deflector zones are arcuate in cross-section and inclined to the plane of the perforated food support or divider wall so that they decrease in cross-sectional size from the aperture towards the wall of the food support or divider.

In the instance of the food support, a preferred arrangement is that the deflector zones extend upwards from the top surface of the support and are directed at an inclination of about 45° to the radius so that the swirling action is a combination of movement in the circumferential and radially outwards directions. The raised deflector zones form raised supports for food supported on the food support with the main advantage that the food cannot block the perforations as set out in the earlier patent referred to above.

In the instance of the walls of the divider, the apertures face downwards and the deflector zones are directed upwards and radially outwards, as indicated by arrow "A" in FIG. 3 of the drawings.

The swirling action of rising steam created by the deflector zones has proved to be highly effective in use.

OBJECT OF THE INVENTION

It is an object of this invention to provide food steaming apparatus of the general type outlined above wherein the swirling action referred to is further enhanced.

SUMMARY OF THE INVENTION

In accordance with one aspect of this invention there is provided a divider for food steaming apparatus comprising a plurality of dividing walls extending from a central region to a peripheral region and wherein a major part of the area of each wall is provided with multiple perforations passing therethrough, the divider being characterized in that at least one opening extends along the lower edge region of each dividing wall with a deflector flap that extends at an incline to the deflector wall having an operatively upper edge joined to the top of the opening and an operatively lower edge spaced circumferentially therefrom such that rising gases that in use contact the deflector flap follow the upwards incline thereof thereby acquiring a circumferential component to the direction of movement.

Further features of this aspect of the invention provide for the deflector flap to be generally flat; for the opening to extend along the major part of the radial dimension of each dividing wall with the inner and outer ends of the wall serving as feet for the divider to stand upon; for the height of the opening to be from 10 to 25 mm with a preferred height being from 15 to 20 mm; for the flap to be inclined to the horizontal at an angle of between 10 and 45° and preferably between 25 and 30°; for the perforations in the balance of the dividing wall to be as described in the earlier patents identified above, that is, with each aperture being orientated in a plane transverse to the plane of the dividing wall with a deflector zone on the side thereof corresponding to the deflector flap such that rising gases flow through the perforations in a generally upwards direction and acquire a transverse component to the direction of movement by contact with the deflector zone; and for the divider to have two, three or four dividing walls.

As a general rule, each dividing wall will be formed as a single integral die cut and pressed sheet of deformable material such as stainless steel, aluminium, or other suitable deformable food grade metal sheet. In such an instance the individual dividing walls are attached to each other in a central region either at generally equal fixed angular spacing or in a hinged adjustable manner. However, it is also within the scope of this invention, that the divider or each dividing wall may be made as a moulded item from a suitable plastics material.

In accordance with a second aspect of the invention there is provided food steaming apparatus comprising a tubular body; at least one perforated food support and a divider as defined above. A cooperant pot and lid may form a part of the food steaming apparatus.

As provided in the earlier patent identified above, the perforations in the divider walls and food support are formed therein by forming cuts in the sheet material and deforming the material in the vicinity of the cut on one side thereof out of the plane of the sheet to provide deflector zones terminating in apertures to the perforations located in planes transverse to the sheet. As indicated above, the deflector zones and apertures to the perforations are directed downwardly in the case of the walls of a divider.

On the other hand, the deflector zones and apertures to the perforations in respect of the food support are directed all in the same general direction relative to a central point in a circumferential yet partially radially outwards direction.

The food steaming apparatus may comprise a single food support member and optionally usable divider or, alternatively, a plurality of food support members and dividers optionally adapted to be supported in a single tubular body or each in its own tubular body that can be selectively stacked on top of a pot, for example.

In order that the invention may be more fully understood one embodiment thereof will now be described with reference to the accompanying drawings.

DETAILED DESCRIPTION WITH REFERENCE TO THE DRAWINGS

Figure 1:
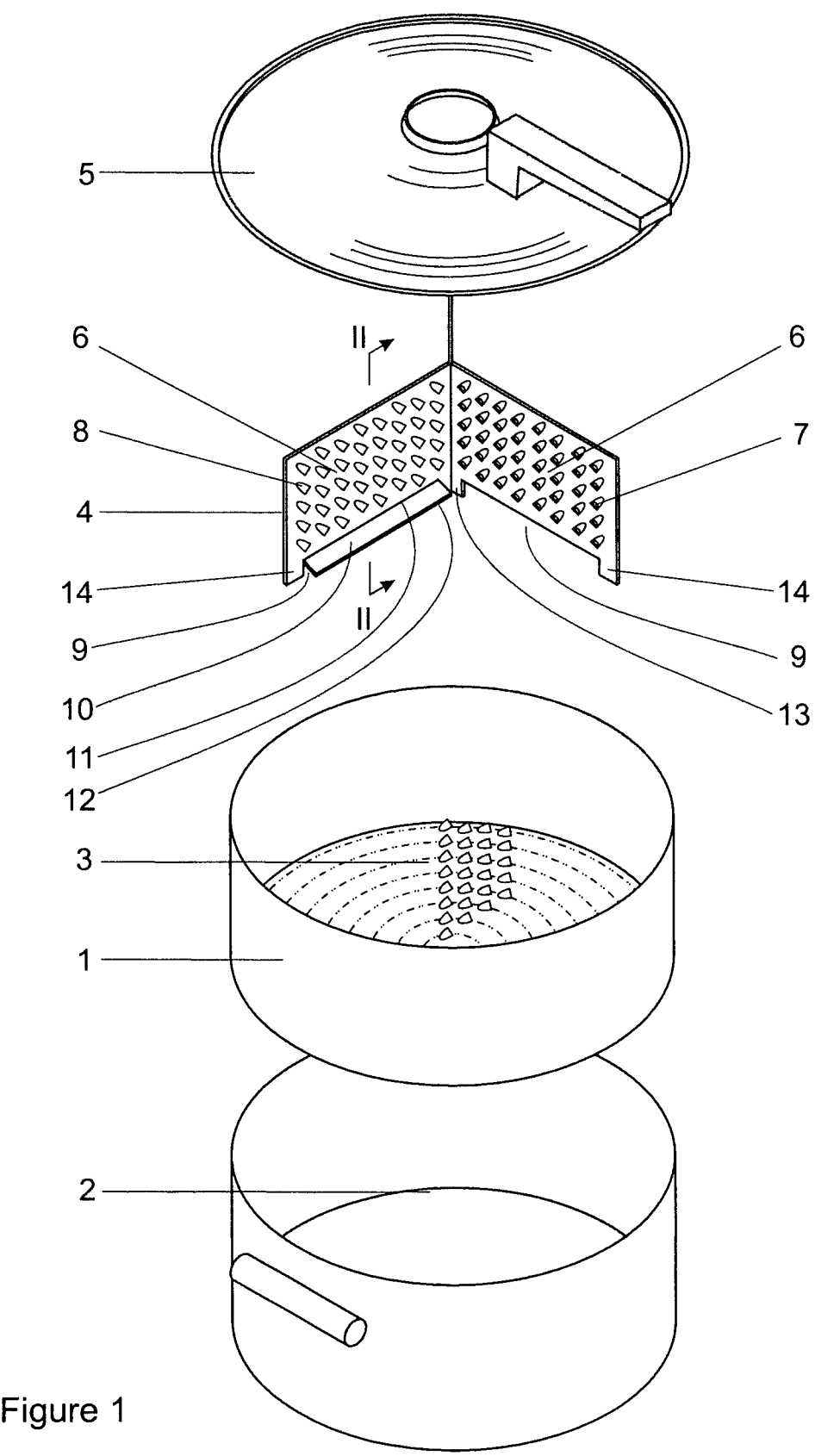
FIG. 1 is an exploded schematic isometric view of one embodiment of the first and second aspects of the invention.

In the embodiment of the invention illustrated in the drawings, food steaming apparatus comprises a tubular body [1] adapted to fit on a pot [2] so that steam can be generated by boiling water in the pot; at least one perforated food support [3] that may be removable or fixed within the tubular body; and a divider [4] as provided by the present invention. Of course, one or more additional tubular bodies and associated perforated food supports and dividers may be provided for use in stacked relationship relative to each other over a pot in well-known manner.

A lid [5], preferably having an outlet arrangement in the central region, is provided for limiting steam loss from the assembly whilst allowing steam to flow within the steamer.

The divider [4] for the food steaming apparatus comprises a plurality of dividing walls [6] extending from a central region to a peripheral region of the tubular body, in use. A major part of the area of each wall is provided with multiple perforations passing therethrough with the aperture [7] of each perforation being orientated in a plane transverse to the plane of the dividing wall. A deflector zone [8] is formed on the one side of the dividing wall such that rising gases are guided through the perforations in a generally upwards direction and have imparted to them, by the deflector zone, a transverse component to the natural convective upward direction of movement.

As provided by this invention, an opening [9] extends along the lower edge region of each dividing wall with a generally flat deflector flap [10] extending at a downwards incline of about 28 degrees to the horizontal from the dividing wall on the side thereof corresponding to that on which the deflector zones of the perforations are located. The deflector flap has an operatively upper edge [11] integral with the top of the opening and an operatively lower edge [12] spaced circumferentially therefrom.

Figure 2:
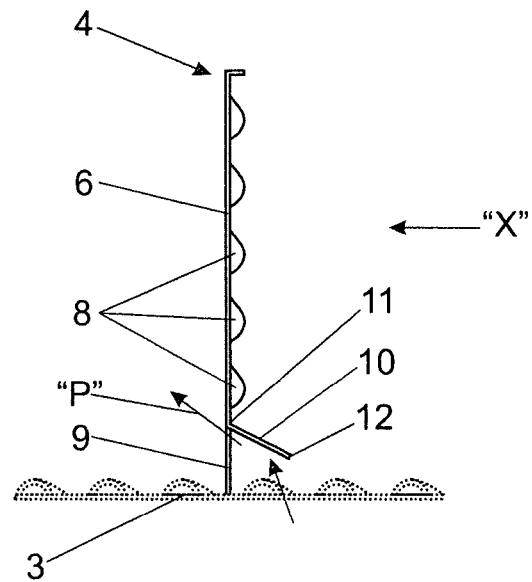
FIG. 2 is a sectional view taken along line II-II in FIG. 1.
Figure 3:
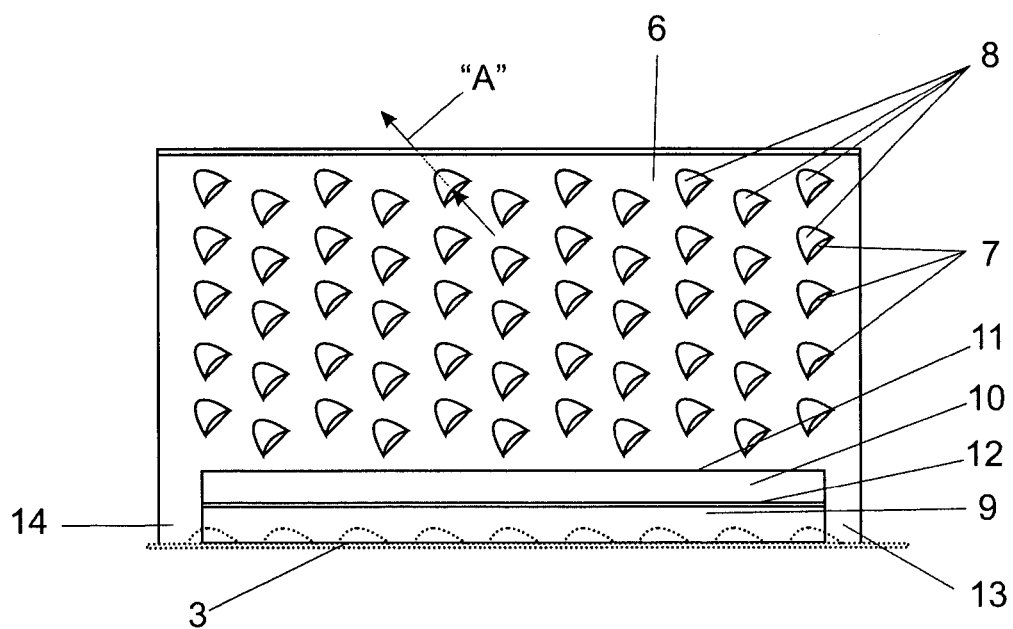
FIG. 3 is a front elevation of a single divider wall taken in the direction of arrow "X" in FIG. 2.

The arrangement is such that rising gases, in use, contact the lower surface of the deflector flap and follow the upwards incline thereof thereby acquiring a circumferential component to their direction of movement before leaving the upper edge of the deflector flap. The movement is generally indicated by arrow "P" in FIG. 2.

At the same time, rising gases enter the downwardly directed apertures of the perforations through the divider wall with the deflector zones likewise imparting a compatible circumferential upwardly and outwardly directed component to the direction of movement of the gases through the perforations.

In this embodiment of the invention the opening extends along the major part of the radial dimension of each dividing wall with the inner and outer ends [13, 14] of the wall serving as feet for the divider to stand on its associated food support. The height of the opening is preferably about 15 to 20 mm.

There may be two, three or four dividing walls making up a divider and the walls may be fixed relative to each other in a central region or they may be hinged together so that compartments formed by them can have adjustable sizes.

The perforations in both the divider walls and food support are formed as indicated above by forming cuts in the sheet material and deforming the material in the vicinity of the cut on one side thereof out of the plane of the sheet.

It will be understood that numerous variations may be made to the embodiment of the invention described above without departing from the scope hereof.

The invention claimed is:

1. A divider for a food steaming apparatus, said divider intended to extend from a central region to a peripheral region of a tubular body adapted to be supported over a pot in which water is boiled to generate steam that is to pass through a perforated food support within the tubular body, said divider comprising a plurality of dividing walls extending from a central region to a peripheral region, wherein a major part of the area of each wall is provided with multiple perforations passing therethrough, and wherein at least one opening extends along the lower edge region of each dividing wall with a deflector flap that extends at an incline to a deflector wall having an operatively upper edge joined to the top of the opening and an operatively lower edge spaced circumferentially therefrom such that rising gases that in use contact the deflector flap follow the upwards incline thereof thereby acquiring a circumferential component to the direction of movement.

2. The divider as claimed in claim 1 in which the deflector flap is generally flat.

3. The divider as claimed in claim 1 wherein the opening extends along the major part of a radial dimension of each dividing wall with inner and outer ends of the wall serving as feet for the divider to stand upon.

4. The divider as claimed in claim 1 wherein the height of the opening is from 10 to 25 mm.

5. The divider as claimed in claim 1 wherein the flap is inclined to the horizontal at an angle of between 10 and 45°.

6. The divider as claimed in claim 5 wherein the flap is inclined to the horizontal at an angle of between 25 and 30°.

7. The divider as claimed in claim 1 wherein each perforation has an aperture orientated in a plane transverse to a plane of the dividing wall with a deflector zone on a side thereof corresponding to the deflector flap such that rising gases flow through the perforations in a generally upwards direction and acquire a transverse component to the direction of movement by contact with the deflector zone.

8. The divider as claimed in claim 1 wherein each dividing wall is formed as a single integral die cut and pressed sheet of deformable material.

9. A food steaming apparatus comprising a tubular body; at least one perforated food support; and a divider including a plurality of dividing walls extending from a central region to a peripheral region of the tubular body, said divider adapted to be supported over a pot in which water is boiled to generate steam that is to pass through a perforated food support within the tubular body, wherein a major part of the area of each wall is provided with multiple perforations passing therethrough, and wherein at least one opening extends along the lower edge region of each dividing wall with a deflector flap that extends at an incline to the deflector wall having an operatively upper edge joined to the top of the opening and an operatively lower edge spaced circumferentially therefrom such that rising gases that in use contact the deflector flap follow the upwards incline thereof thereby acquiring a circumferential component to the direction of movement.

10. The food steaming apparatus as claimed in claim 9 further including a cooperant pot and lid.

\* \* \* \* \*